US011966632B2

(12) United States Patent
Izzi et al.

(10) Patent No.: US 11,966,632 B2
(45) Date of Patent: Apr. 23, 2024

(54) READING SEQUENTIAL DATA USING MAPPING INFORMATION STORED AT A HOST DEVICE

(71) Applicant: Micron Technology, Inc., Boise, ID (US)

(72) Inventors: Roberto Izzi, Caserta (IT); Nicola Colella, Capodrise (IT); Luca Porzio, Casalnuovo (IT); Marco Onorato, Villasanta (IT)

(73) Assignee: Micron Technology, Inc., Boise, ID (US)

( * ) Notice: Subject to any disclaimer, the term of this patent is extended or adjusted under 35 U.S.C. 154(b) by 58 days.

(21) Appl. No.: 17/556,066

(22) Filed: Dec. 20, 2021

(65) Prior Publication Data

US 2023/0195374 A1 Jun. 22, 2023

(51) Int. Cl.
*G06F 12/00* (2006.01)
*G06F 3/06* (2006.01)
*G06F 12/02* (2006.01)

(52) U.S. Cl.
CPC .......... *G06F 3/0659* (2013.01); *G06F 3/0604* (2013.01); *G06F 3/0679* (2013.01); *G06F 12/0246* (2013.01); *G06F 2212/7201* (2013.01)

(58) Field of Classification Search
CPC .... G06F 3/0659; G06F 3/0604; G06F 3/0679; G06F 12/0246; G06F 2212/7201

USPC ......................................................... 711/100
See application file for complete search history.

(56) References Cited

U.S. PATENT DOCUMENTS

| | | | | |
|---|---|---|---|---|
| 2018/0089076 | A1* | 3/2018 | Li | G06F 3/0665 |
| 2020/0371908 | A1* | 11/2020 | Cariello | G06F 3/0688 |
| 2021/0365382 | A1* | 11/2021 | Choi | G06F 12/0246 |
| 2022/0019525 | A1* | 1/2022 | Shih | G06F 12/0246 |

FOREIGN PATENT DOCUMENTS

KR 20190057887 A * 11/2017

* cited by examiner

*Primary Examiner* — Mardochee Chery
(74) *Attorney, Agent, or Firm* — Holland & Hart LLP

(57) ABSTRACT

Methods, systems, and devices are described to indicate, in an entry of logical to physical (L2P) mapping information stored at a host system, whether data associated with the entry is sequential to other data associated with a next entry or a previous entry. Each entry may have a third field, which may indicate whether the data is sequential. Based on the third field, the host system may determine whether data to be read from a memory system is sequential. The host system may transmit one read command to the memory system if the data is sequential, where the read command may include at least a portion of an L2P entry associated with the data. Similarly, based on the third field, the memory system may determine whether the data to be read is sequential, and may read additional, sequential data if the memory system determines that the data is sequential.

20 Claims, 8 Drawing Sheets

READING SEQUENTIAL DATA USING MAPPING INFORMATION STORED AT A HOST DEVICE

FIELD OF TECHNOLOGY

The following relates generally to one or more systems for memory and more specifically to reading sequential data using mapping information stored at a host device.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
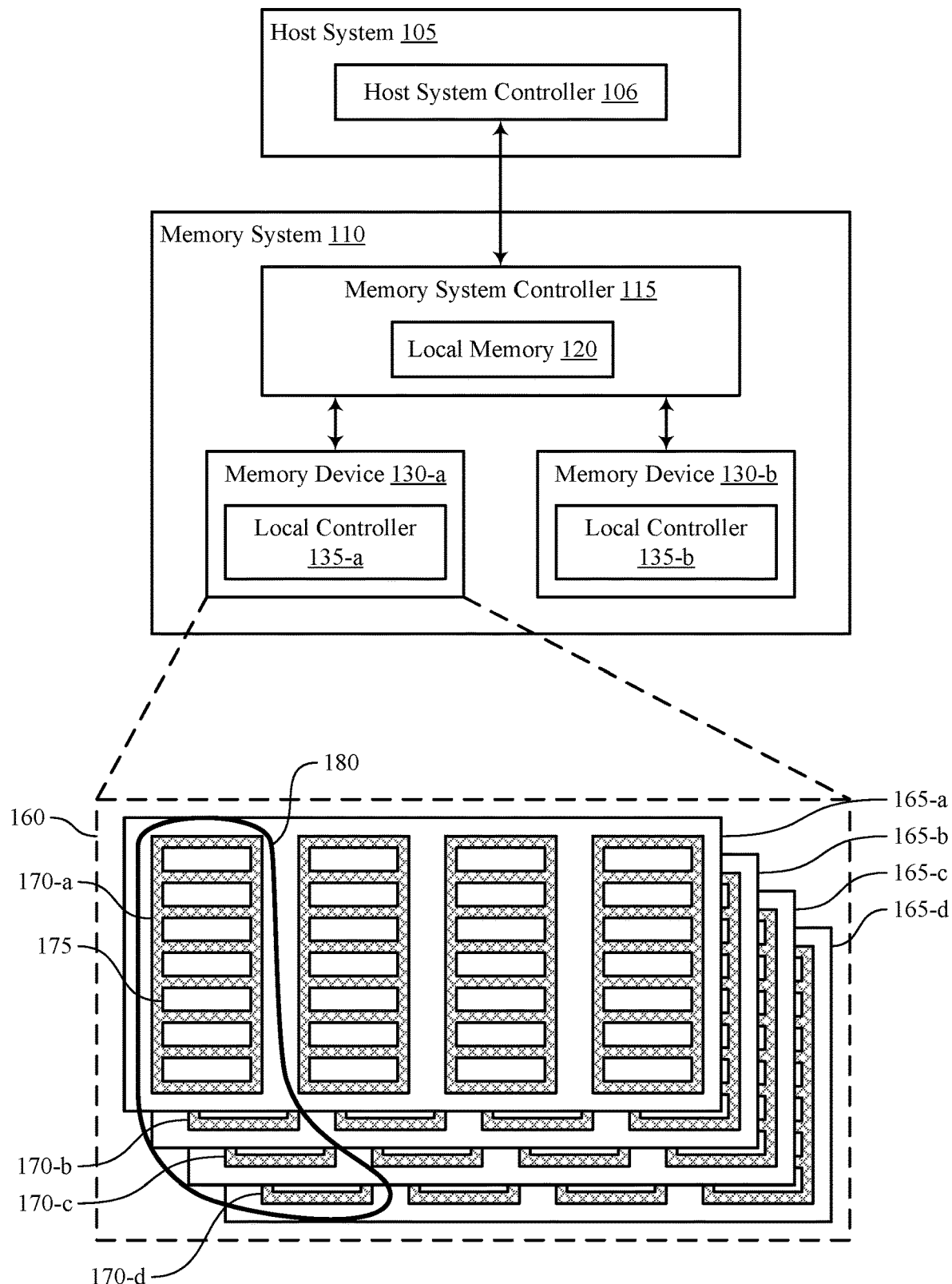
FIG. 1 illustrates an example of a system that supports reading sequential data using mapping information stored at a host device in accordance with examples as disclosed herein.

A host system and a memory system may implement one or more techniques to translate logical addresses to physical addresses of a memory array of the memory system. The one or more techniques may, for example, include using a logical-to-physical (L2P) mapping, which may indicate one or more logical addresses and one or more corresponding physical addresses. In some cases, L2P mapping information may be sent or loaded to a second memory array of the memory system that may be used to manage a first array (e.g., a main array) of the memory system. In some cases (e.g., to reduce or avoid the performance degradation), a host performance booster (HPB) feature may be implemented to store information, such as L2P information, at the host system. The HPB feature may be implemented by using, for example, a memory array of the host system (e.g., volatile memory) as a cache for HPB information, such as an HPB table (e.g., an L2P mapping table, other L2P data structure), which may store or indicate at least some L2P mapping information for the memory array of the memory system. For example, the HPB information, such as the HPB table, may include at least two fields for each entry, where a first field may indicate a logical address of a block of data and a second field may indicate a corresponding physical address of the block of data.

The HPB feature may support operational modes for reading data from the memory system. In a first operational mode, data to be read from the memory system may be smaller than a threshold data size (e.g., a threshold quantity of data) and the host system may issue one command to read the data. In a second operational mode, data to be read from the memory system may be bigger than the threshold data size, and the host system may issue a first command to associate different blocks of data with a same identifier and a second command to read the associated data. In examples in which the data to be read from the memory system is sequential, the second operational mode may have an impact on performance (e.g., may increase read latency) because multiple commands are used to initiate reading the data, and because the memory system may perform additional searching to identify blocks of data with the same identifier. Further, some devices (e.g., memory systems, host systems) may support the first operational mode and not the second operational mode, which may cause problems executing the HPB commands.

The present disclosure provides techniques for including, in one or more entries (if not each entry) of HPB information, such as an HPB table, an indication of whether the data associated the entry is sequential to other data associated with one or more other entries, such as a next entry or a previous entry in the table. For example, one or more entries, if not each entry, may have a third field, which may indicate a quantity of remaining space (e.g., remaining data blocks) in a sequential stream of data. The memory system may determine the value of one or more third fields, if not each third field, for the HPB entries (e.g., may determine whether data in the HPB entries is sequential or not), and may send the HPB entries (and/or an indication of the HPB entries) to the host system (e.g., for storage) with a respective third field for each entry (e.g., indicating whether the data is sequential and a quantity of sequential data). Based on an associated third field, the host system may determine whether data to be read from the memory system is sequential, and may transmit one read command to the memory system if the data is sequential (e.g., even if a quantity of the data exceeds the data size threshold), where the read command may include at least a portion of an HPB entry associated with the data. Similarly, based on the third field (e.g., as included in the HPB entry in the read command), the memory system may determine whether the data to be read is sequential, and may read additional, sequential data (e.g., data in addition to that indicated in the read command) if the memory system determines that the data is sequential. Based on or in response to reading the additional, sequential data, the memory system may transmit the sequential data to the host system, for example, in response to the one read command.

Figure 2:
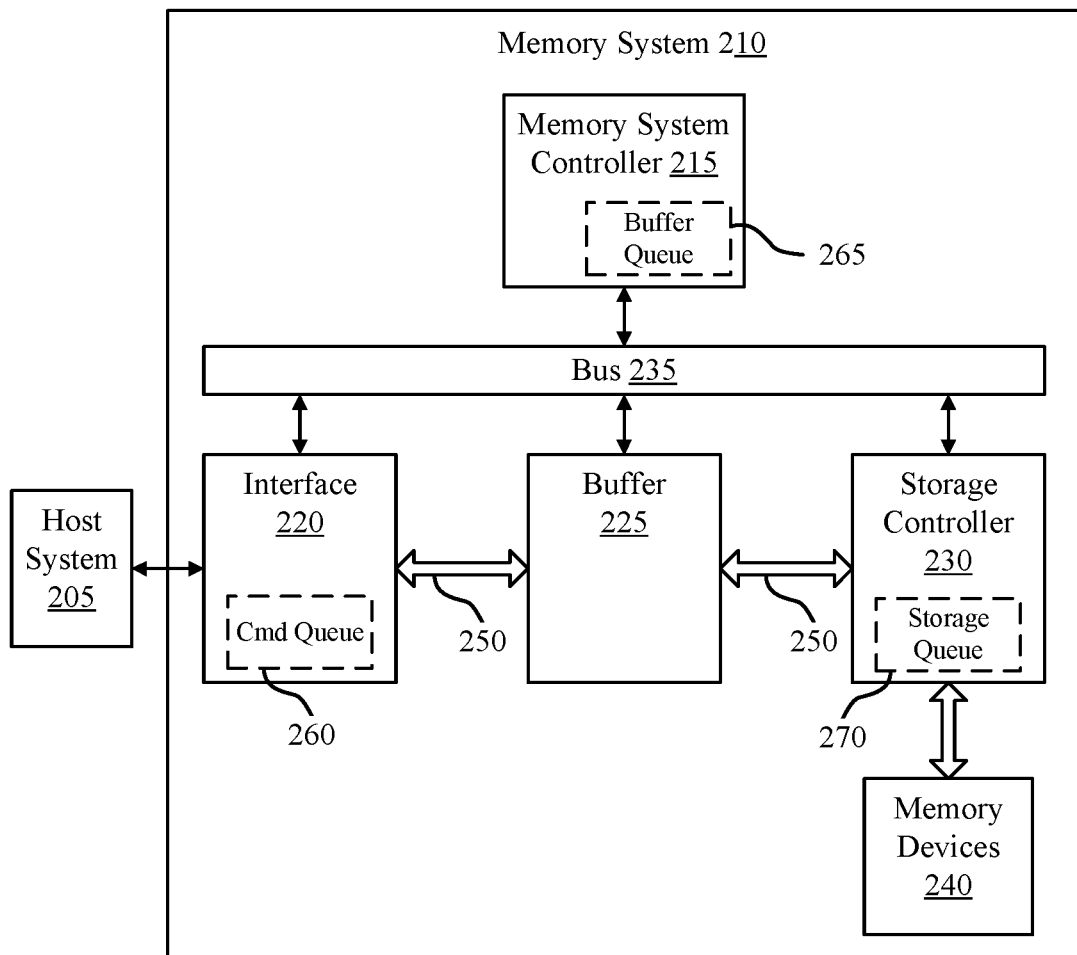
FIG. 2 illustrates an example of a system that supports reading sequential data using mapping information stored at a host device in accordance with examples as disclosed herein.

Features of the disclosure are initially described in the context of systems, devices, and circuits with reference to FIGS. 1 through 2. Features of the disclosure are described in the context of an architecture and a flow diagram with reference to FIGS. 3 and 4. These and other features of the disclosure are further illustrated by and described in the context of apparatus diagrams and flowcharts that relate to reading sequential data using mapping information stored at a host device with reference to FIGS. 5-8.

FIG. 1 illustrates an example of a system 100 that supports reading sequential data using mapping information stored at a host device in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses (PBAs)) associated with memory cells within the memory devices 130. In some cases, the host system 105 may store some information associated with address translations between logical addresses and physical addresses (e.g., may store some L2P information, such as using an HPB feature).

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-*d* that are within planes 165-*a*, 165-*b*, 165-*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update an L2P mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115. In some cases, one or more copies of an L2P mapping table (e.g., or a portion thereof) may be stored within a memory array of the host system 105 (e.g., a volatile memory array), such as in examples using an HPB feature. In such cases, pertinent L2P mapping information may be accessed by the host system 105 and transmitted to the memory system 110 in examples including requesting data to be read from a memory device 130 of the memory system 110.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

The system 100 may include any quantity of non-transitory computer readable media that support reading sequential data using mapping information stored at a host device. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

A memory system 110 or a host system 105, or both, may include, in each entry of an L2P mapping table (e.g., an HPB entry in an HPB table), an indication of whether the data associated the entry is sequential to other data associated with a next entry or a previous entry in the table. For example, each entry may have a third field, which may indicate a quantity of remaining space (e.g., remaining data blocks) in a sequential stream of data. The memory system 110 may determine the value of each third field for the HPB entries (e.g., may determine whether data in the HPB entries is sequential or not), and may send the HPB entries to the host system 105 (e.g., for storage) with a respective third field for each entry (e.g., indicating whether the data is sequential and a quantity of sequential data).

Based on an associated third field, the host system 105 may determine whether data to be read from the memory system 110 is sequential, and may transmit one read command to the memory system 110 if the data is sequential (e.g., even if a quantity of the data exceeds a data size threshold), where the read command may include at least a portion of an HPB entry associated with the data. Similarly, based on the third field (e.g., as included in the HPB entry in the read command), the memory system 110 may determine whether the data to be read is sequential, and may read additional, sequential data (e.g., data in addition to that indicated in the read command) if the memory system 110 determines that the data is sequential. Based on or in response to reading the additional, sequential data, the memory system 110 may transmit the sequential data to the host system 105, in response to the one read command.

FIG. 2 illustrates an example of a system 200 that supports reading sequential data using mapping information stored at a host device in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands (e.g., read and write commands, such as HPB commands) to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, in examples in which the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

Some L2P mapping information (e.g., HPB information or HPB entries) may be stored at a host system 205, for example, according to an HPB feature or protocol. In some cases, entries of the L2P mapping information may indicate whether data associated with a respective entry is sequential to other data associated with a next entry or a previous entry. Each entry may have a third field, which may indicate whether the data is sequential. Based on the third field, the host system 205 may determine whether data to be read from the memory system 210 is sequential. The host system 205 may transmit one read command to the memory system 210 if the data is sequential, where the read command may include at least a portion of an L2P entry associated with the data. Similarly, based on the third field, the memory system 210 may determine whether the data to be read is sequential, and may read and transmit additional, sequential data if the memory system 210 determines that the data is sequential.

Figure 3:
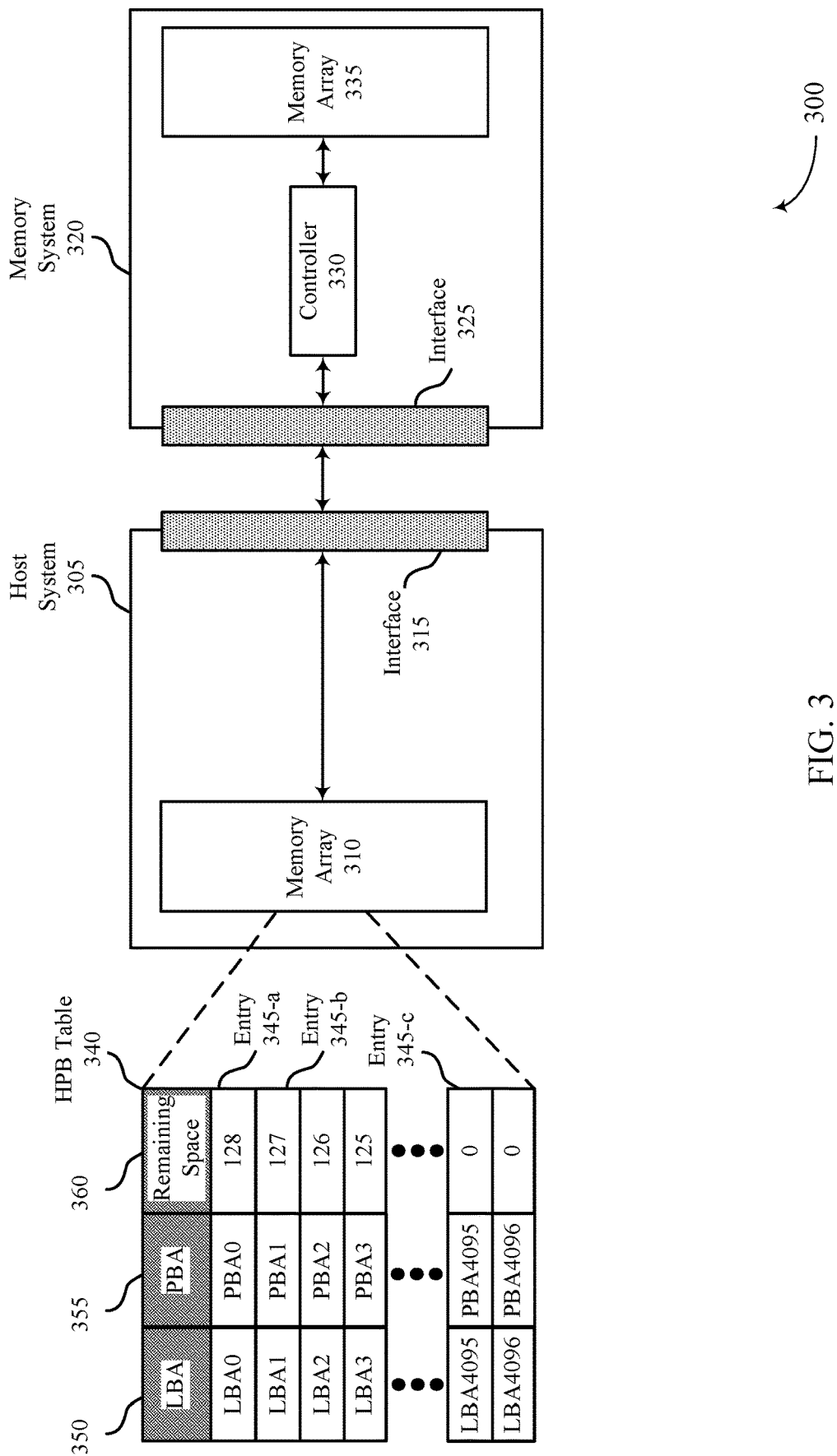
FIG. 3 illustrates an example of an architecture that supports reading sequential data using mapping information stored at a host device in accordance with examples as disclosed herein.

FIG. 3 illustrates an example of an architecture 300 that supports reading sequential data using mapping information stored at a host device in accordance with examples as disclosed herein. Architecture 300 may represent a device architecture 300 or a system architecture 300, for example, with reference to a respective memory device, memory system, or host system as described with reference to FIG. 1. For example, architecture 300 may be implemented at a host system 305 and a memory system 320, which may represent an example of a host system 105 and a memory system 110 as described with reference to FIG. 1. While the examples described herein reference a host system 305 and a memory system 320, it is to be understood that the same examples may apply to a host device and a memory device without departing from the scope of the present disclosure.

The host system 305 and the memory system 320 may be coupled with each other via respective interfaces 315 and 325 (e.g., via one or more lines, wires, traces, electrodes), such that the host system 305 and the memory system 320 may communicate with each other to exchange information and data (e.g., via signaling). The interface 315 may be coupled with (e.g., directly or via one or more other components) a memory array 310 (e.g., DRAM) of the host system 305. The interface 325 may be coupled with a controller 330 of the memory system 320, and the controller 330 may be coupled with a memory array 335 of the memory system 320. In some cases, the interface 325 may also be coupled with (e.g., directly or indirectly coupled with) the memory array 335.

In some cases, the architecture 300 may implement one or more techniques to translate logical addresses (e.g., LBAs) to physical addresses (e.g., PBAs). For example, the memory system 320 may translate one or more logical addresses of input output (IO) requests (e.g., read commands transmitted from the host system 305 to the memory system 320) to corresponding physical addresses used for data storage at the memory array 335 of the memory system 320 (e.g., flash storage, UFS), in order to access data indicated by the one or more logical addresses. The one or more techniques may, for example, include using a L2P mapping, which may indicate one or more logical addresses (e.g., LBA(s)) and one or more corresponding physical addresses (e.g., PBA(s)). The L2P mapping information may be loaded to a second memory array of the memory system 320 (e.g., SRAM, such as in the controller 330 of the memory system 320).

In examples in which the capacity of data storage at the memory array 335 is larger, and therefore the L2P mapping information is larger, a larger amount of storage (e.g., of the second memory array) may be used to store the L2P mapping data, which may result in a larger second memory array and an increase in cost and system size. To reduce the size of the second memory array, and thereby reduce cost and size of the memory system 320, portions of the L2P mapping information may be partially stored at the second memory array, and other portions of the L2P mapping information may be partially stored at the memory array 335. Due to this partial storing, some portions of the L2P mapping information may not fully be stored in the second memory array, which may cause performance degradation in examples in which related areas of the memory array 335 are requested to be accessed (e.g., in examples in which physical addresses associated with requested logical addresses that are not stored in the L2P mapping information in the second memory array are requested to be accessed). For example, the performance degradation may include an increase in latency due to looking up the L2P mapping information in the second memory array, failing to find all or some of the L2P mapping information in the second memory array, and then looking up the L2P mapping information in the memory array 335.

To reduce or avoid the performance degradation, a host performance booster (HPB) feature may be implemented. The HPB feature may be implemented by using the memory array 310 (e.g., DRAM) of the host system 305 as a cache for an HPB table 340 (e.g., or other data structure), which may store or indicate at least some L2P mapping information for the memory array 335. For example, the HPB table 340 may include at least two fields for each entry 345 of the HPB table 340, where a first field 350 may indicate an LBA of block of data (e.g., an identifier or number of the LBA), and where a second field 355 may indicate a corresponding PBA of the block of data (e.g., an identifier or number of the PBA). Thus, each entry 345 of the HPB table 340 may indicate an L2P mapping for a corresponding block of data.

The memory array 310 may be associated with relatively fast data storage and access, which may support relatively quick access of the information in the HPB table 340. Further, the memory array 310 may also have a relatively high quantity of available storage (e.g., compared to the second memory array or SRAM of the memory system 320), which may support storage of higher amounts of L2P mapping information. The HPB table 340 may be stored at the host system 305 based on or in response to one or more commands (e.g., an "HPB READ BUFFER" command, an "HPB READ" command). In a first example, the HPB feature may be configured to operate in a device control mode (e.g., a memory system control mode). In the device control mode, the memory system 320 may send a request to activate a sub-region of the memory array 310 for storing the HPB information, and may indicate which portions of an L2P mapping table may be stored at the memory array 310 (e.g., the memory system 320 may initiate storage of the HPB information at the host system 305). In a second example, the HPB feature may be configured to operate in a host control mode. In the host control mode, the host system 305 may activate a sub-region of the memory array 310 for HPB information (e.g., independent of a request from the memory system 320), such that one or more entries 345 (e.g., entries in the HPB table 340) may be loaded in the memory array 310 of the host system 305. In the host control mode, the host system 305 may select which portions of the L2P mapping table are to be stored at the memory array 310.

In either control mode, the host system 305 may indicate the activated sub-region (e.g., may activate the sub-region for the memory system 320) using a first read command (e.g., HPB READ BUFFER command) issued to the memory system 320, which may indicate the HPB sub-region to the memory system 320. The first read command (e.g., HPB READ BUFFER) may also request for the memory system 320 to send entries 345 (e.g., HPB entries) to the host system 305. Entries 345 may be loaded to the HPB table 340 in the memory array 310, for example, based on or in response to an indication of L2P mapping information from the memory system 320 (e.g., in response to the HPB READ BUFFER command). In some cases, the host system 305 may deactivate an HPB sub-region and notify the memory system 320 of the deactivation by issuing a write command (e.g., an "HPB WRITE BUFFER" command). Based on or in response to the entries 345 stored at the memory array 310, the host system 305 may issue a second read command (e.g., HPB READ command) that utilizes the loaded entries 345 (e.g., HPB entries) to request data to be read from the memory array 335 of the memory system 320.

For example, the second read command may provide the physical address (e.g., PBA) of a logical block of data to be read (e.g., based on the stored HPB information, or L2P mapping information), in addition to providing a logical address (e.g., LBA) of the logical block. Based on or in response to using the HPB feature, the memory system 320 may read data at an increased speed compared to data read without using the HPB feature. For example, because an HPB READ command may include an indication of a physical address (e.g., PBA) associated with requested data, the memory system 320 may refrain from looking up the physical address for the requested data (e.g., stored in L2P information, such as in SRAM), which may increase a speed for reading data at the memory system 320.

The HPB feature may also support multiple operational modes (e.g., a single HPB read mode and a coupled HPB read mode). In such examples, a data size (e.g., transfer length) threshold may be set to determine which mode of the multiple operational modes to use. The data size threshold (e.g., a parameter "bMAX_DATA_SIZE_FOR_HPB_SINGLE_CMD") may, for example, identify a maximum quantity of data (e.g., HPB data size) for using a first operational mode (e.g., single HPB read mode), or a maximum quantity of data transfer (e.g., reading from the memory system 320 to the host system 305) supported using one HPB READ command. The data size threshold may fall within a range of values (e.g., having a value between 4 kilobytes (kB) and 1 megabyte (MB)), and, in some cases, may be set to a default value (e.g., 32 kB).

If a transfer length (e.g., a multiple of a base data size, such as multiple of 4 kB) of a block of data to be read from the memory system 320 to the host system 305 is equal to or less than the data size threshold, the host system 305 may use the first operational mode (e.g., single HPB read mode) by setting an identifier field (e.g., an "HPB READ ID" field) of an HPB READ command equal to zero. In examples in which the identifier field is equal to zero the first operational mode is selected, and the HPB READ command, as previously described, may be used to read a quantity of data (e.g., 4 kB) up to the data size threshold, where the quantity of data to be read may be indicated by a field of the HPB READ command (e.g., a "TRANSFER LENGTH" field, which may indicate an integer multiple of the base data size).

If the transfer length of the block of data to be read is greater than the data size threshold, the host system 305 may use a second operational mode (e.g., coupled HPB read mode). For the second operational mode, the host system 305 may identify entries 345 (e.g., HPB entries) to transfer to the memory system 320 that correspond to the data to be read (e.g., multiple blocks of data), and may assign a same identifier field (e.g., HPB_READ_ID) to the entries 345. The host system 305 may transfer the identified entries 345 (e.g., HPB entries) to the memory system 320 by issuing a write command (e.g., an "HPB WRITE BUFFER" command) that is associated with the shared identifier field (e.g., HPB_READ_ID field). In response to the HPB WRITE BUFFER command, the memory system 320 may store the received entries 345 (e.g., HPB entries), with the corresponding identifier information (e.g., HPB_READ_ID tag information). The host system 305 may issue an HPB READ command to the memory system 320, with the same identifier field (e.g., HPB_READ_ID). Based on or in response to the HPB READ command, the memory system 320 may search for and read each block of data associated with the respective identifier field.

The multiple HPB READ commands may be issued in order (e.g., in an order of the corresponding data), each with the same HPB_READ_ID. The memory system 320 may read the data associated with the corresponding HPB entries of the multiple commands together and may transmit the data to the host system 305 (e.g., based on the HPB READ commands being associated with a same HPB_READ_ID). In this way, the second operational mode may support reading data from the memory system 320 without being restricted to the data size threshold.

In some cases, such as in examples in which the data to be read from the memory system 320 is random (e.g., non-sequential), the second operational mode may support reading a larger quantity of data in a shorter time period (e.g., because the associated entries 345 (e.g., HPB entries) may be transmitted via one command to support reading the non-sequential data). However, in examples in which the data to be read from the memory system 320 is sequential, the second operational mode may have an impact on performance (e.g., may increase read latency) because two commands (e.g., an HPB WRITE BUFFER and an HPB READ command) are used to initiate reading the data, and the memory system 320 may have to identify, or search for, each chunk of data associated with a read identifier. In some examples, the order between the HPB WRITE BUFFER and HPB READ commands for every logical block may affect a performance of the HPB READ command in the second operational mode. Further, some devices (e.g., memory systems 320 and/or host systems 305) may support the first operational mode and not the second operational mode, which may cause problems in examples in which executing the HPB commands (e.g., the order between the commands may be affected in examples in which a device does not support the second operational mode).

The present disclosure provides techniques for including, in each entry 345 (e.g., HPB entry), an indication of whether the data associated with a respective entry 345 is sequential to other data associated with a next entry 345 or a previous entry 345 (e.g., associated with a next or a previous PBA). For example, each entry 345 may have a third field 360, which may indicate a quantity of remaining space (e.g., remaining data blocks, remaining LBAs, remaining PBAs) in a sequential stream of data (e.g., sequential blocks or sections of data). The memory system 320 may determine the value of each third field 360 for the entries 345 (e.g., may determine whether data in the entries 345 is sequential or not), and may send the entries 345 (e.g., HPB entries) to the host system 305 with a respective third field 360 for each entry 345 (e.g., indicating whether the data is sequential and a quantity of sequential data).

The quantity of remaining data (e.g., sequential data) may include data for the associated entry 345 and, if the quantity of remaining data is greater than '1' (e.g., if the value of the third field 360 for an entry 345 is greater than '1'), may also include data for following entries 345. For example, entry 345-a may indicate a value of '128' for the corresponding third field 360, which may indicate that a sequential stream of data includes at least the data associated with entry 345-a and data associated with the following 127 entries (e.g., for a total of 128 entries 345). Similarly, entry 345-b may indicate a value of '127' for the corresponding third field 360, which may indicate that a sequential stream of data includes at least the data associated with entry 345-b and data associated with the following 126 entries (e.g., for a total of 127 entries 345). The following entries 345 associated with the sequential data may each be associated with a respective value for the third field 360 in this manner (e.g., a decreasing value for each successive entry 345), until a last entry 345 associated with the sequential data, which may have a third field 360 having a value of '1.'

If the third field 360 is set to a value of '0,' the third field 360 may indicate that the associated data (e.g., data block) is random, or is non-sequential to data associated with other entries 345. For example, the third field 360 of an entry 345-c may indicate that data associated with the entry 345-c is part of a random stream of data by indicating a value of '0.'

In one example, the HPB table 340 may be associated with the L2P mapping for a 16 MB region of memory storage at the memory array 335 of the memory system 320, which may result in a total of 4,096 entries 345 (e.g., PBAs and LBAs) in the HPB table 340. If each LBA identifier or value (e.g., indicated by the first field 350) is tied to a corresponding PBA identifier value (e.g., indicated by the second field 355), the values may be the same (e.g., have a same number or identifier value). As such, the first field 350 may be an implied field of the HPB table 340 (e.g., may represent a field derived from, based on, or equal to a value of the second field 355) and may not take up any actual storage space. The second field 355 for each entry 345 may use 7 bytes (B) of storage (e.g., at the memory array 310), in order to indicate a value up to 4,096. In this example, the third field 360 for each entry 345 may use 1 B of storage (e.g., at the memory array 310), such that the third field 360 may indicate up to a value of '255' (e.g., may indicate any value from '0' to '255').

In such cases, a total size for the HPB table 340 (e.g., an amount of storage taken by the HPB table 340) may be equal to 32 kB (e.g., 4,096 entries 345 multiplied by 8 total bytes per entry 345). It is to be understood that the amounts of storage used by the fields described herein are merely examples, and that a field (e.g., a field 350, 355, or 360), and therefore an HPB table 340, may use any amount of storage (e.g., any quantity of bits, bytes) without departing from the scope of the present disclosure.

As described herein, the memory array 310 may store the HPB table 340 at the host system 305, for example, based on HPB information or entries 345 (e.g., HPB entries) sent from the memory system 320 to the host system 305 (e.g., via the interfaces 315 and 325, in the device control mode or in the host control mode), where the entries 345 (e.g., HPB entries) stored in the HPB table 340 may include a third field 360 indicating a remaining quantity of data in a sequential stream of data. Based on the third field 360, the host system 305 may determine which HPB operational mode (e.g., the first operational mode or the second operational mode) to use in examples in which requesting data from the memory system 320 (e.g., in examples in which issuing an HPB READ command). For example, based on the third field 360 (e.g., a value of the third field 360) of an entry 345 in the HPB table 340 (e.g., associated with data to be read from the memory system 320), the host system 305 may determine that the associated data is part of a sequential stream of data.

Because the data is part of a sequential stream, the host system 305 may determine to issue one read command (e.g., HPB READ command) to read all or part of the sequential data, for example, instead of issuing multiple commands (e.g., an HPB WRITE BUFFER and HPB READ command) to read all or part of the sequential data. For example, if the host system 305 determines that the data is sequential, the host system 305 may include, in the HPB READ command, an entry 345 (e.g., HPB entry) that includes a base physical address for the data to be read (e.g., a base PBA). The entry 345 (e.g., HPB entry) may also include a corresponding third field 360, which may indicate a quantity of sequential data associated with the base physical address. The host system 305 may also include, in the HPB READ command, a transfer length of data to be read from the memory system 320, which may be any amount of data within the sequential data stream.

Based on or in response to the HPB READ command, the memory device may identify the base physical address from the included entry 345, as well as the quantity of sequential data associated with the base physical address. Based on the quantity of sequential data, the memory system 320 may read sequential data, starting from the base physical address, up through the indicated transfer length. The memory system 320 may transmit the sequential data from the read operation to the host system 305.

For example, the host system 305 may determine to read data beginning at a logical or physical address associated with the entry 345-a. Because the entry 345-a is part of a sequential data stream (e.g., as indicated by the corresponding third field 360), the host system 305 may use the first operational mode (e.g., using one HPB READ command) to reduce the latency caused by the additional overhead (e.g., the HPB WRITE BUFFER command and the HPB READ command) of the second operational mode. The host system 305 may transmit an HPB READ command to the memory system 320, where the HPB READ command may include entry 345-a (e.g., HPB entry), and may indicate a transfer length within the sequential stream of data associated with entry 345-a (e.g., HPB entry). The memory system 320 may receive the HPB READ command, may determine that the indicated data is sequential (e.g., based on a value of the third field 360 in the included entry 345-a), and may read and transmit the sequential data up through the indicated transfer length (e.g., starting at a PBA0 associated with the entry 345-a).

For data that is random or non-sequential, but is larger than the data threshold size, the host system 305 may use the second operational mode to request data from the memory system 320, which may support reading more data in a quicker fashion than using the first mode alone. In the example of data associated with the entry 345-c (e.g., in examples in which the host system requests data larger than the data threshold size), the host system 305 may use the second operational mode and may transmit an HPB WRITE BUFFER command, followed by an HPB READ command.

In some cases, in order to support using the first operational mode to read data larger quantities of data (e.g., greater than the data threshold size), the data size threshold value may be increased (e.g., to any value up to 1 MB) by the host system 305. In such cases, the host system 305 may use the first operational mode to request sequential streams of data for greater transfer lengths than a current default value.

In some cases, the techniques described herein may support decreased latency for requesting larger quantities of sequential data, for example, in comparison with using the second operational mode (e.g., using an HPB WRITE BUFFER and HPB READ commands together). For example, by indicating whether the data is sequential in the associated entry 345 (e.g., HPB entry), the host system 305 and the memory system 320 may identify relatively larger amounts of sequential data to be read using one HPB READ command, which may reduce latency compared with using multiple commands. Such techniques may also be supported by devices, systems, or components thereof, that do not support the second operational mode. In such cases, the devices, systems, or components thereof, may thus support reading relatively larger quantities of sequential data using one HPB READ command (e.g., larger quantities than previously able to read using one HPB READ command).

In some cases, the HPB information or entries 345 (e.g., HPB entries) sent from the memory system 320 to the host system 305 may be encrypted by the memory system 320 (e.g., by the controller 330 or other component of the memory system 320). Accordingly, the host system 305 may be unable to decrypt and use the information included in the entries 345 (e.g., HPB entries) stored at the host system 305. In such cases, the host system 305 may use the HPB feature without the advantages or enhancement provided by the indication of sequential data. For example, the host system 305 may use one command (e.g., HPB READ command) to request data having a size less than or equal to the data size threshold and may use multiple commands (e.g., an HPB WRITE BUFFER and HPB READ command) to request data having a size greater than the data size threshold.

Figure 4:
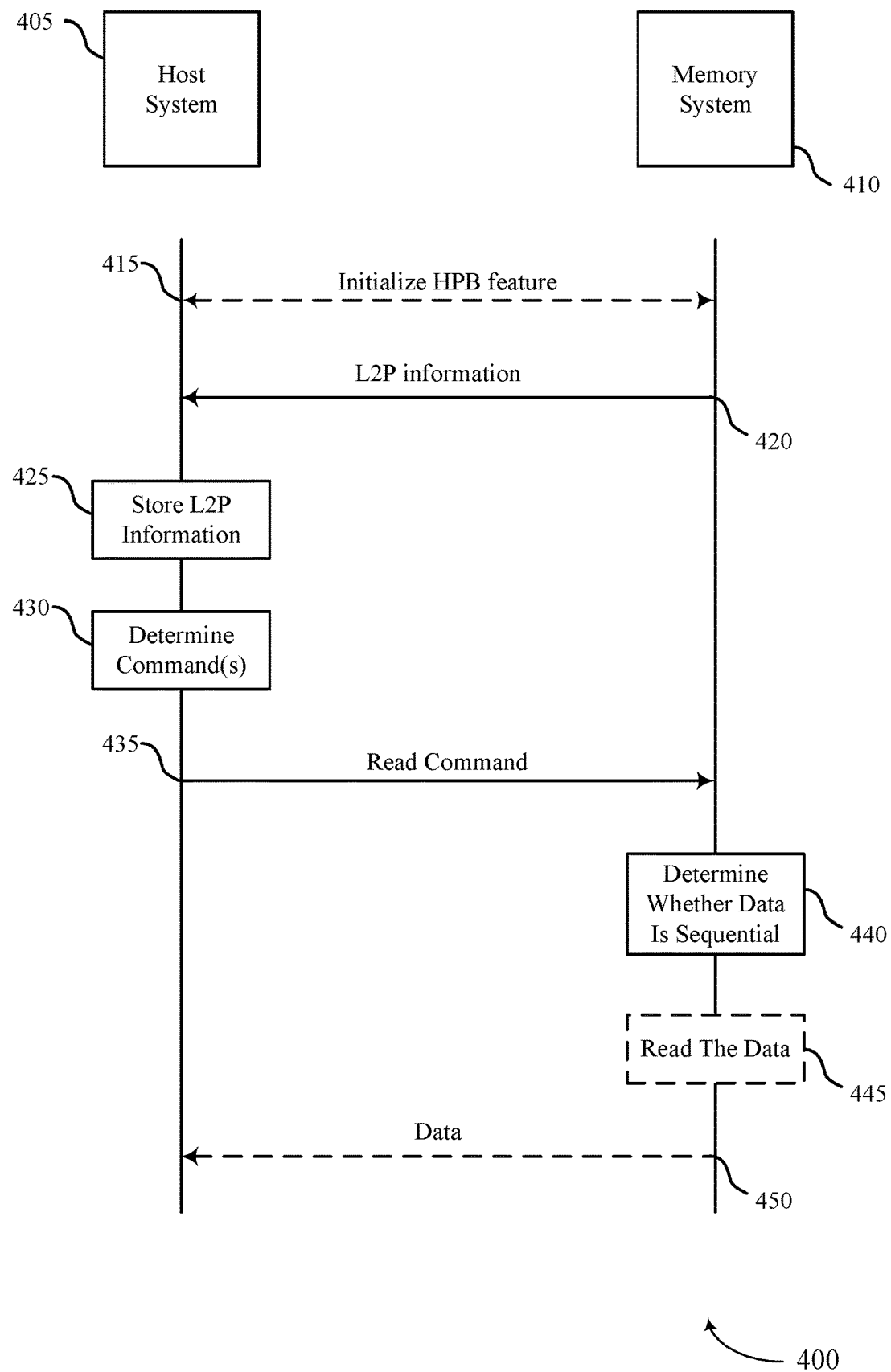
FIG. 4 illustrates an example of a process flow that supports reading sequential data using mapping information stored at a host device in accordance with examples as disclosed herein.

FIG. 4 illustrates an example of a process flow 400 that supports reading sequential data using mapping information stored at a host device in accordance with examples as disclosed herein. In some examples, process flow 400 may implement or be implemented by one or more aspects of systems 100 or 200, as well as architecture 300. For example, process flow 400 may be implemented by a host system 405 and a memory system 410, which may be examples of a host system and a memory system described with reference to FIGS. 1-3.

In the following description of process flow 400, the operations may be performed in a different order than the order shown, or the operations performed by host system 405 and memory system 410 may be performed in different orders or at different times. For example, some operations may also be left out of process flow 400, or other operations may be added to process flow 400. Although host system 405 and memory system 410 are shown performing the operations of process flow 400, some aspects of some operations may also be performed by one or more other devices or systems.

At 415, in some cases, the host system 405 and the memory system 410 may initialize an HPB feature, which may be an example of an HPB feature described with reference to FIG. 3. For example, the host system 405 may initialize a sub-region of memory to store HPB information (e.g., an HPB table as described with reference to FIG. 3) in response to a determination made at the host system 405 to store HPB information, or in response to a request transmitted from the memory system 410 to the host system 405 to store the HPB information at the host system 405 (e.g., at the memory of the host system 405). After initializing the sub-region of memory, the host system 405 may transmit, to the memory system 410, a request for HPB information (e.g., HPB entries of the HPB table), such as via an HPB READ BUFFER command.

At 420, the memory system 410 may transmit, to the host system 405, L2P mapping information associated with data stored at the memory system 410. For example, in response to the request for the HPB information, the memory system 410 may transmit, to the host system 405, one or more HPB entries or other HPB information that indicates L2P mapping information. The L2P mapping information may include a set of multiple entries that each include a respective first field indicating a logical address, a respective second field indicating a physical address, and a respective third field indicating whether data associated with the respective entry is sequential to data associated with one or more other entries of the set of multiple entries.

At 425, the host system 405 may store the L2P mapping information at the host system 405. For example, the host system 405 may store the L2P mapping information in an HPB table in volatile memory of the host system 405.

At 430, the host system 405 may determine whether to read data (e.g., first data and second data) from the memory system 410 using one command (e.g., an HPB READ command) or multiple commands (e.g., an HPB WRITE BUFFER and HPB READ command). For example, the host system 405 may determine to read the data from the memory system 410, and the host system 405 may determine whether to use one command or multiple commands based on a value of a third field of an entry (e.g., HPB entry) associated with the data (e.g., associated with the first data, the second data, or both), from the set of multiple entries. As described with reference to FIG. 3, the third field may indicate whether the data is part of a sequential data stream (e.g., is sequential data) or is random, non-sequential data. As described with reference to FIG. 3, the third field may indicate an order of the data in the sequential data stream, or may indicate a quantity of PBAs that each include sequential data, beginning at the data.

At 435, based on the determination made at 430, the host system 405 may transmit, to the memory system 410, a command (e.g., an HPB READ command) indicating for the memory system to read the first data, where the command may include at least a portion of the entry associated with the first data. For example, the command may include a second field of the entry (e.g., as described with reference to FIG. 3) indicating a physical address (e.g., PBA) associated with the first data. Additionally or alternatively, the command may include the second field of the entry, a first field of the entry (e.g., as described with reference to FIG. 3) indicating a logical address (e.g., LBA) associated with the first data, and a third field of the entry (e.g., as described with reference to FIG. 3) indicating whether the first data is part of a sequential data stream.

The host system 405 may also include, in the command, an indication of a quantity of data (e.g., a transfer length) to read from the memory system 410 to the host system 405. The quantity of data may be equal to a quantity of the first data (e.g., in the case of non-sequential data), or may be greater than the quantity of the first data (e.g., in the case of sequential data). For example, in the case of requesting sequential data, the quantity of data indicated in the command may be less than or equal to a quantity of a stream of sequential data that includes the first data.

At 440, the memory system 410 may determine whether to read, in addition to the first data and in response to the command, the second data from a second physical address that is sequential to a first physical address of the first data. For example, the memory system 410 may determine whether the first data is sequential, based on a value of the third field of the entry associated with the first data, and may determine whether to read additional, sequential data (e.g., the second data) based on or in response to the determination of whether the data is sequential. For example, in some cases, the memory system 410 may determine to refrain from reading data in addition to the first data (e.g., the second data) based on the value of the third field of the entry indicating that the first data and the second data are non-sequential. In some cases, the memory system 410 may determine to read the additional data (e.g., including the second data) based on the value of the third field of the entry indicating that the first data and the second data are sequential. For example, in some cases, based on the value of the third field of the entry, the memory system 410 may identify multiple physical addresses that each comprise sequential data (e.g., including the second data), beginning at the first data.

Y may also identify, in the command, the indication of the quantity of data to read from the memory system 410 to the host system 405. If the first data is non-sequential, the quantity of data may be equal to the quantity of the first data, and the memory system 410 may determine to read the first data. If the first data is sequential, the quantity of data may be less than or equal to a quantity of the sequential data stream (e.g., may be greater than the quantity of the first data), and the memory system 410 may determine to read the indicated quantity of data from the sequential data stream.

At 445, in some cases, the memory system 410 may read the first data from the first physical address (e.g., PBA) of a memory array (e.g., MNAND array) of the memory system 410, based on or in response to the determination made at 440. For example, if the first data is non-sequential, the memory system 410 may read the first data from the first physical address of the memory array (e.g., and stop reading data until indicated by another command from the host system 405). If the first data is sequential, the memory system 410 may read the first data from the first physical address and the second data from the second physical address of the memory array. In some cases, the memory system 410 may read the first data from the first address, and may read additional sequential data from the multiple physical addresses that each comprise sequential data. For example, the memory system 410 may read the first data and the additional sequential data based on the quantity of data indicated in the command (e.g., and the determination that the data is sequential).

At 450, in some cases, the memory system 410 may transmit any data read from the memory array of the memory system 410 to the host system 405. For example, if the memory system 410 reads the first data (e.g., and no other data), the memory system 410 may transmit the first data to the host system 405. Alternatively, if the memory system 410 read the first data and additional, sequential data (e.g., the second data and/or other data), the memory system 410 may transmit the first data and the additional, sequential data to the host system 405.

Figure 5:
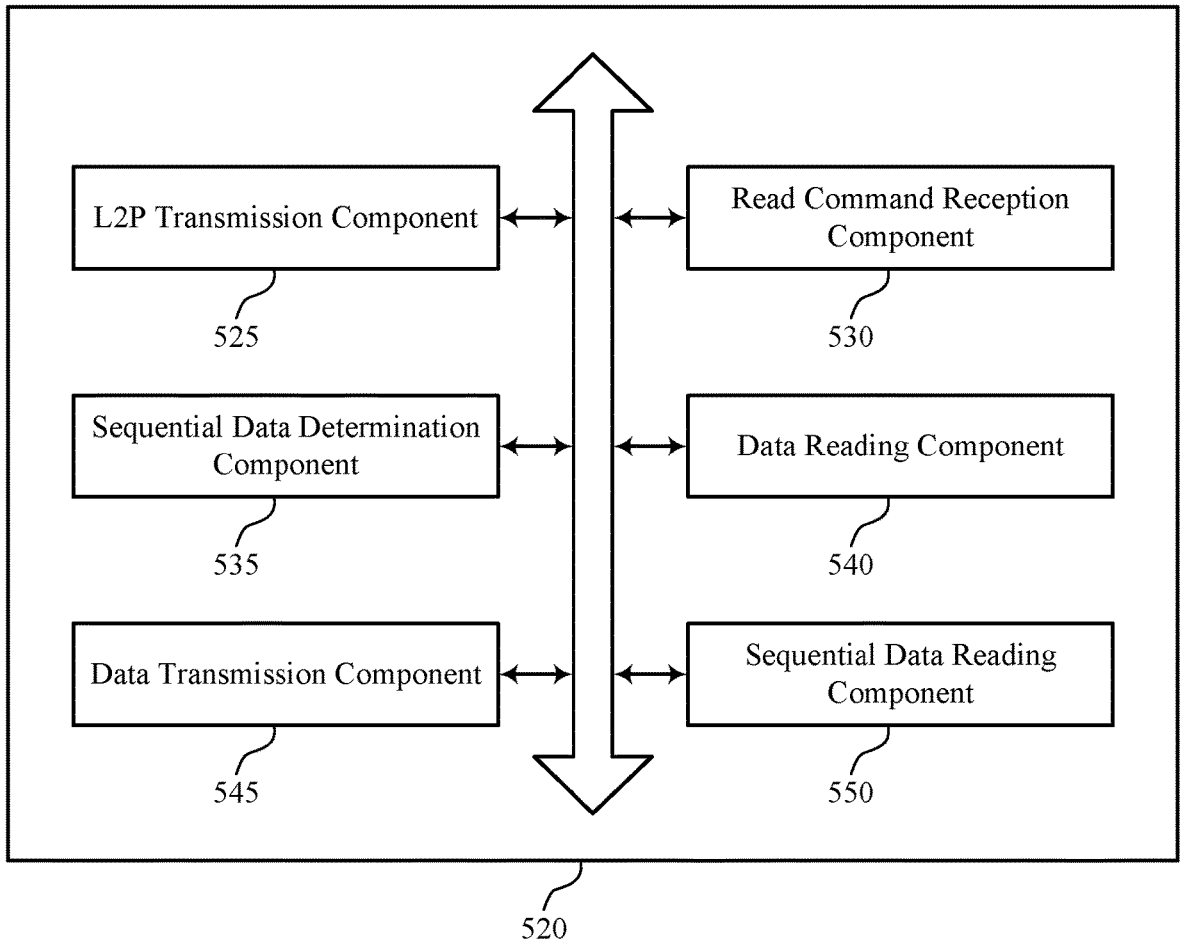
FIG. 5 shows a block diagram of a memory device that supports reading sequential data using mapping information stored at a host device in accordance with examples as disclosed herein.

FIG. 5 shows a block diagram 500 of a memory device 520 that supports reading sequential data using mapping information stored at a host device in accordance with examples as disclosed herein. The memory device 520 may be an example of aspects of a memory device as described with reference to FIGS. 1 through 4. The memory device 520, or various components thereof, may be an example of means for performing various aspects of reading sequential data using mapping information stored at a host device as described herein. For example, the memory device 520 may include a L2P transmission component 525, a read command reception component 530, a sequential data determination component 535, a data reading component 540, a data transmission component 545, a sequential data reading component 550, or any combination thereof. Each of these components may communicate, directly or indirectly, with one another (e.g., via one or more buses).

The L2P transmission component 525 may be configured as or otherwise support a means for transmitting, to a host system, logical to physical mapping information associated with data stored at a memory system, the logical to physical mapping information including a plurality of entries that each include a respective first field indicating a logical address, a respective second field indicating a physical address, and a respective third field indicating whether data associated with the respective entry is sequential to data associated with one or more other entries of the plurality of entries. The read command reception component 530 may be configured as or otherwise support a means for receiving, at the memory system, a command indicating for the memory system to read first data stored at the memory system, the command including at least a portion of an entry associated with the first data from the plurality of entries of the logical to physical mapping information. The sequential data determination component 535 may be configured as or otherwise support a means for determining whether to read, in addition to the first data and in response to the command, second data from a second physical address that is sequential to a first physical address of the first data based at least in part on a value of a third field of the entry associated with the first data.

In some examples, to support determining whether to read the second data, the sequential data determination component 535 may be configured as or otherwise support a means for determining to refrain from reading the second data based at least in part on the value of the third field of the entry indicating that the first data and the second data are non-sequential.

In some examples, to support determining whether to read the second data, the sequential data determination component 535 may be configured as or otherwise support a means for determining to read the second data based at least in part on the value of the third field of the entry indicating that the first data and the second data are sequential.

In some examples, the sequential data reading component 550 may be configured as or otherwise support a means for reading the first data from the first physical address in response to receiving the command. In some examples, the sequential data reading component 550 may be configured as or otherwise support a means for reading the second data from the second physical address in response to receiving the command and based at least in part on determining to read the second data. In some examples, the data transmission component 545 may be configured as or otherwise support a means for transmitting the first data and the second data to the host system based at least in part on reading the first data and reading the second data.

In some examples, the sequential data determination component 535 may be configured as or otherwise support a means for identifying a plurality of physical addresses that each include sequential data beginning at the first data based at least in part on the value of the third field of the entry, where the plurality of physical addresses includes the second physical address and the sequential data includes the second data.

In some examples, the sequential data reading component 550 may be configured as or otherwise support a means for reading the first data from the first physical address and the sequential data from the plurality of physical addresses in response to receiving the command and based at least in part on identifying the plurality of physical addresses. In some examples, the data transmission component 545 may be configured as or otherwise support a means for transmitting the first data and the sequential data to the host system based at least in part on reading the first data and reading the sequential data.

In some examples, the read command reception component 530 may be configured as or otherwise support a means for identifying, in the command, an indication of a quantity of data to read from the memory system to the host system. In some examples, the data reading component 540 may be configured as or otherwise support a means for reading the first data from the first physical address based at least in part on the indication of the quantity of data, where the quantity of data is equal to a quantity of the first data. In some examples, the data transmission component 545 may be configured as or otherwise support a means for transmitting the first data to the host system based at least in part on reading the first data.

In some examples, the read command reception component 530 may be configured as or otherwise support a means for identifying, in the command, an indication of a quantity of data to read from the memory system to the host system. In some examples, the sequential data reading component 550 may be configured as or otherwise support a means for reading the first data from the first physical address and a stream of sequential data following the first data from a plurality of physical addresses based at least in part on the indication of the quantity of data, where the stream of sequential data includes the second data and the plurality of physical addresses includes the second physical address, and where the quantity of data is greater than a quantity of the first data. In some examples, the data transmission component 545 may be configured as or otherwise support a means for transmitting the first data and the stream of sequential data to the host system based at least in part on reading the first data and reading the stream of sequential data.

In some examples, the value of the third field of the entry indicates a quantity of a plurality of physical addresses that each include sequential data beginning at the first data.

In some examples, the value of the third field of the entry indicates an order of the first data in a sequential stream of data.

In some examples, the at least the portion of the entry includes a second field of the entry indicating the first physical address.

In some examples, the at least the portion of the entry includes a second field of the entry indicating the first physical address, a first field of the entry indicating a first logical address corresponding to the first physical address, and the third field of the entry.

Figure 6:
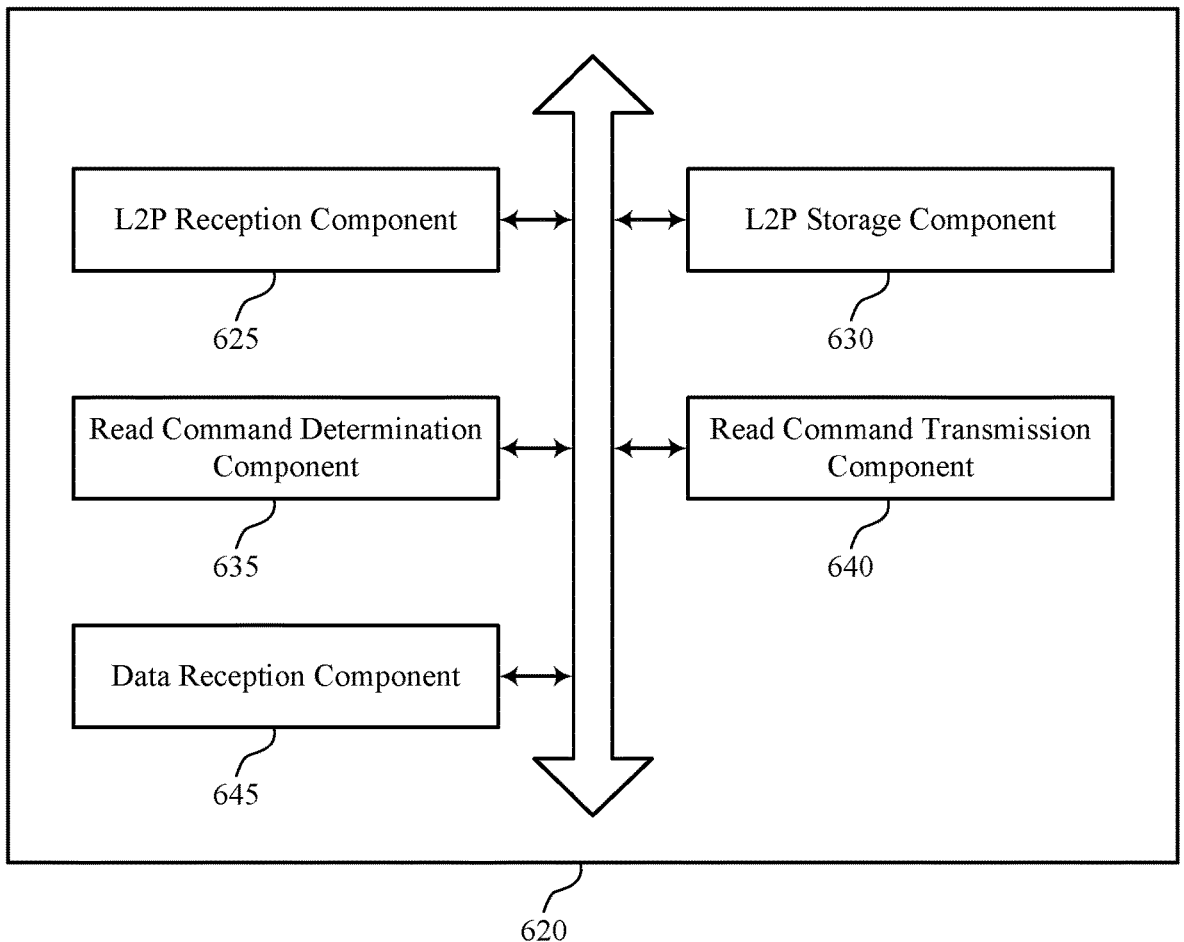
FIG. 6 shows a block diagram of a host device that supports reading sequential data using mapping information stored at a host device in accordance with examples as disclosed herein.

FIG. 6 shows a block diagram 600 of a host device 620 that supports reading sequential data using mapping information stored at a host device in accordance with examples as disclosed herein. The host device 620 may be an example of aspects of a host device as described with reference to FIGS. 1 through 4. The host device 620, or various components thereof, may be an example of means for performing various aspects of reading sequential data using mapping information stored at a host device as described herein. For example, the host device 620 may include a L2P reception component 625, a L2P storage component 630, a read command determination component 635, a read command transmission component 640, a data reception component 645, or any combination thereof. Each of these components may communicate, directly or indirectly, with one another (e.g., via one or more buses).

The L2P reception component 625 may be configured as or otherwise support a means for receiving, at a host system, logical to physical mapping information associated with data stored at a memory system, the logical to physical mapping information including a plurality of entries that each include a respective first field indicating a logical address, a respective second field indicating a physical address, and a respective third field indicating whether data associated with the respective entry is sequential to data associated with one or more other entries of the plurality of entries. The L2P storage component 630 may be configured as or otherwise support a means for storing the logical to physical mapping information at the host system. The read command determination component 635 may be configured as or otherwise support a means for determining whether to read first data and second data from the memory system using one command or a plurality of commands based at least in part on a value of a third field of an entry associated with the first data and from the plurality of entries. The read command transmission component 640 may be configured as or otherwise support a means for transmitting, to the memory system, a command indicating for the memory system to read the first data based at least in part on determining whether to read the first data and the second data from the memory system using one command or a plurality of commands, the command including at least a portion of the entry associated with the first data.

In some examples, to support determining whether to read the first data and the second data from the memory system using one command or a plurality of commands, the read command determination component 635 may be configured as or otherwise support a means for determining to read the first data and the second data using a first plurality of commands based at least in part on the value of the third field of the entry indicating that the first data and the second data are non-sequential, where the first plurality of commands includes the command.

In some examples, to support determining whether to read the first data and the second data from the memory system using one command or a plurality of commands, the read command determination component 635 may be configured as or otherwise support a means for determining to read the first data and the second data using one command based at least in part on the value of the third field of the entry indicating that the first data and the second data are sequential.

In some examples, the data reception component 645 may be configured as or otherwise support a means for receiving, from the memory system, the first data and the second data in response to transmitting the command and based at least in part on determining to read the first data and the second data using one command.

In some examples, the read command determination component 635 may be configured as or otherwise support a means for identifying a plurality of physical addresses that each include sequential data beginning at the first data based at least in part on the value of the third field of the entry, where the sequential data includes the second data, and where determining to read the first data and the second data using one command is based at least in part on identifying the plurality of physical addresses.

In some examples, the data reception component 645 may be configured as or otherwise support a means for receiving, from the memory system, the first data and the sequential data in response to transmitting the command and based at least in part on identifying the plurality of physical addresses.

In some examples, the read command determination component 635 may be configured as or otherwise support a means for including, in the command, an indication of a quantity of data to read from the memory system to the host system. In some examples, the data reception component 645 may be configured as or otherwise support a means for receiving, from the memory system, the first data based at least in part on the indication of the quantity of data, where the quantity of data is equal to a quantity of the first data.

In some examples, the read command determination component 635 may be configured as or otherwise support a means for including, in the command, an indication of a quantity of data to read from the memory system to the host system, where the quantity of data is determined based at least in part on a quantity of a stream of sequential data including the first data and the second data, the quantity of data less than or equal to the quantity of the stream of sequential data. In some examples, the data reception component 645 may be configured as or otherwise support a means for receiving, from the memory system, the stream of sequential data in response to transmitting the command including the indication of the quantity of data, where the stream of sequential data includes the second data.

In some examples, the value of the third field of the entry indicates a quantity of a plurality of physical addresses that each include sequential data beginning at the first data.

In some examples, the value of the third field of the entry indicates an order of the first data in a sequential stream of data.

In some examples, the at least the portion of the entry includes a second field of the entry indicating a first physical address associated with the first data.

In some examples, the at least the portion of the entry includes a second field of the entry indicating a first physical address associated with the first data, a first field of the entry indicating a first logical address corresponding to the first physical address, and the third field of the entry.

Figure 7:
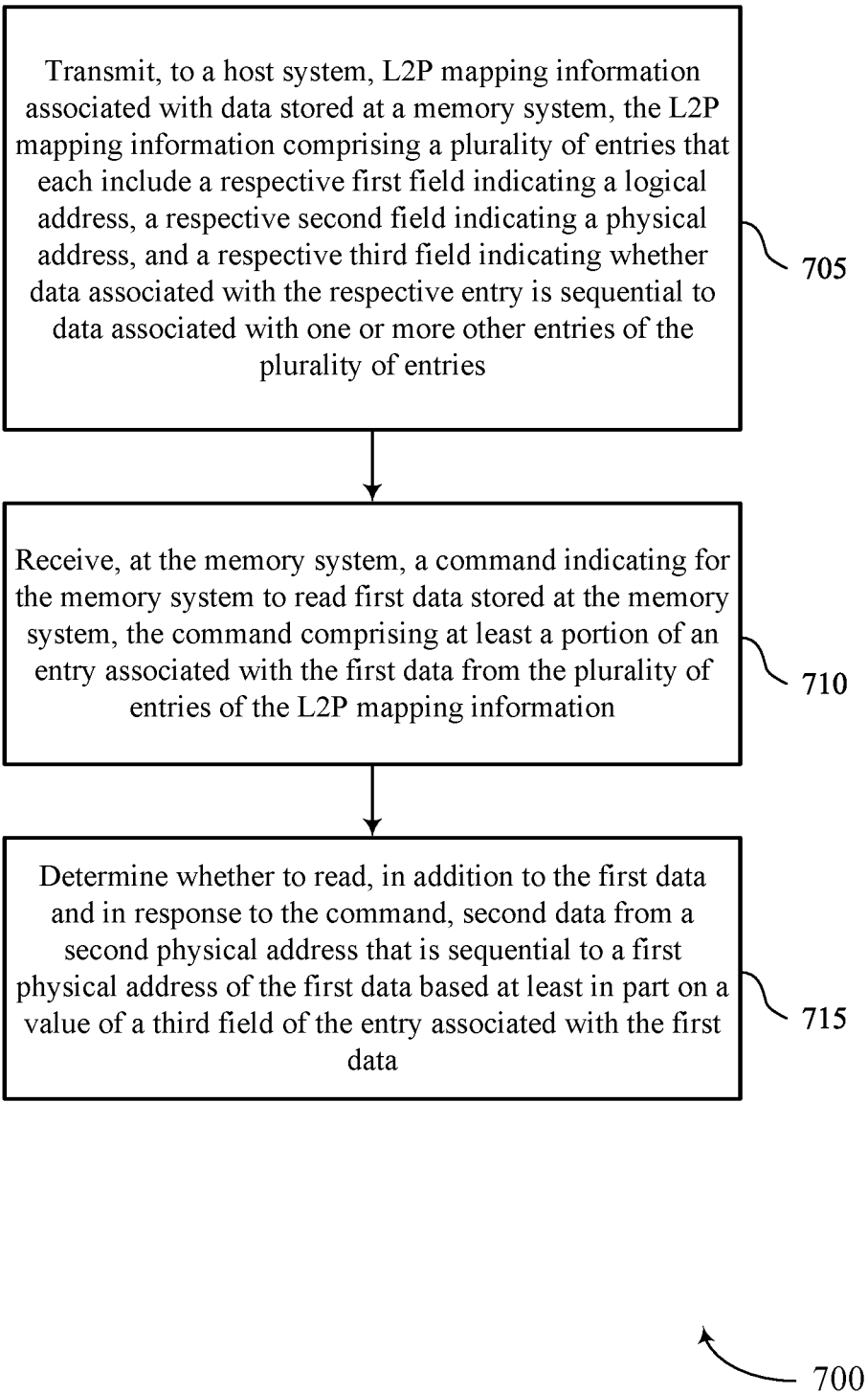
FIGS. 7 and 8 show flowcharts illustrating a method or methods that support reading sequential data using mapping information stored at a host device in accordance with examples as disclosed herein.

FIG. 7 shows a flowchart illustrating a method 700 that supports reading sequential data using mapping information stored at a host device in accordance with examples as disclosed herein. The operations of method 700 may be implemented by a memory device or its components as described herein. For example, the operations of method 700 may be performed by a memory device as described with reference to FIGS. 1 through 5. In some examples, a memory device may execute a set of instructions to control the functional elements of the device to perform the described functions. Additionally or alternatively, the memory device may perform aspects of the described functions using special-purpose hardware.

At 705, the method may include transmitting, to a host system, logical to physical mapping information associated with data stored at a memory system, the logical to physical mapping information including a plurality of entries that each include a respective first field indicating a logical address, a respective second field indicating a physical address, and a respective third field indicating whether data associated with the respective entry is sequential to data associated with one or more other entries of the plurality of entries. The operations of 705 may be performed in accordance with examples as disclosed herein. In some examples, aspects of the operations of 705 may be performed by a L2P transmission component 525 as described with reference to FIG. 5.

At 710, the method may include receiving, at the memory system, a command indicating for the memory system to read first data stored at the memory system, the command including at least a portion of an entry associated with the first data from the plurality of entries of the logical to physical mapping information. The operations of 710 may be performed in accordance with examples as disclosed herein. In some examples, aspects of the operations of 710 may be performed by a read command reception component 530 as described with reference to FIG. 5.

At 715, the method may include determining whether to read, in addition to the first data and in response to the command, second data from a second physical address that is sequential to a first physical address of the first data based at least in part on a value of a third field of the entry associated with the first data. The operations of 715 may be performed in accordance with examples as disclosed herein. In some examples, aspects of the operations of 715 may be performed by a sequential data determination component 535 as described with reference to FIG. 5.

In some examples, an apparatus as described herein may perform a method or methods, such as the method 700. The apparatus may include, features, circuitry, logic, means, or instructions (e.g., a non-transitory computer-readable medium storing instructions executable by a processor), or any combination thereof for performing the following aspects of the present disclosure:

Aspect 1: The apparatus, including features, circuitry, logic, means, or instructions, or any combination thereof for transmitting, to a host system, logical to physical mapping information associated with data stored at a memory system, the logical to physical mapping information including a plurality of entries that each include a respective first field indicating a logical address, a respective second field indicating a physical address, and a respective third field indicating whether data associated with the respective entry is sequential to data associated with one or more other entries of the plurality of entries; receiving, at the memory system, a command indicating for the memory system to read first data stored at the memory system, the command including at least a portion of an entry associated with the first data from the plurality of entries of the logical to physical mapping information; and determining whether to read, in addition to the first data and in response to the command, second data from a second physical address that is sequential to a first physical address of the first data based at least in part on a value of a third field of the entry associated with the first data.

Aspect 2: The apparatus of aspect 1 where determining whether to read the second data, further includes operations, features, circuitry, logic, means, or instructions, or any combination thereof for determining to refrain from reading the second data based at least in part on the value of the third field of the entry indicating that the first data and the second data are non-sequential.

Aspect 3: The apparatus of aspect 1 where determining whether to read the second data, further includes operations, features, circuitry, logic, means, or instructions, or any combination thereof for determining to read the second data based at least in part on the value of the third field of the entry indicating that the first data and the second data are sequential.

Aspect 4: The apparatus of aspect 3, further including operations, features, circuitry, logic, means, or instructions, or any combination thereof for reading the first data from the first physical address in response to receiving the command; reading the second data from the second physical address in response to receiving the command and based at least in part on determining to read the second data; and transmitting the first data and the second data to the host system based at least in part on reading the first data and reading the second data.

Aspect 5: The apparatus of any of aspects 3 through 4, further including operations, features, circuitry, logic, means, or instructions, or any combination thereof for identifying a plurality of physical addresses that each include sequential data beginning at the first data based at least in part on the value of the third field of the entry, where the plurality of physical addresses includes the second physical address and the sequential data includes the second data.

Aspect 6: The apparatus of aspect 5, further including operations, features, circuitry, logic, means, or instructions, or any combination thereof for reading the first data from the first physical address and the sequential data from the plurality of physical addresses in response to receiving the command and based at least in part on identifying the plurality of physical addresses and transmitting the first data and the sequential data to the host system based at least in part on reading the first data and reading the sequential data.

Aspect 7: The apparatus of any of aspects 1 through 2, further including operations, features, circuitry, logic, means, or instructions, or any combination thereof for identifying, in the command, an indication of a quantity of data to read from the memory system to the host system; reading the first data from the first physical address based at least in part on the indication of the quantity of data, where the quantity of data is equal to a quantity of the first data; and transmitting the first data to the host system based at least in part on reading the first data.

Aspect 8: The apparatus of any of aspects 3 through 6, further including operations, features, circuitry, logic, means, or instructions, or any combination thereof for identifying, in the command, an indication of a quantity of data to read from the memory system to the host system; reading the first data from the first physical address and a stream of sequential data following the first data from a plurality of physical addresses based at least in part on the indication of the quantity of data, where the stream of sequential data includes the second data and the plurality of physical addresses includes the second physical address, and where the quantity of data is greater than a quantity of the first data; and transmitting the first data and the stream of sequential data to the host system based at least in part on reading the first data and reading the stream of sequential data.

Aspect 9: The apparatus of any of aspects 3 through 6 and 8, further including operations, features, circuitry, logic, means, or instructions, or any combination thereof for the value of the third field of the entry indicates a quantity of a plurality of physical addresses that each include sequential data beginning at the first data.

Aspect 10: The apparatus of any of aspects 3 through 6, 8, and 9, further including operations, features, circuitry, logic, means, or instructions, or any combination thereof for the value of the third field of the entry indicates an order of the first data in a sequential stream of data.

Aspect 11: The apparatus of any of aspects 1 through 10, further including operations, features, circuitry, logic, means, or instructions, or any combination thereof for the at least the portion of the entry includes a second field of the entry indicating the first physical address.

Aspect 12: The apparatus of any of aspects 1 through 11, further including operations, features, circuitry, logic, means, or instructions, or any combination thereof for the at least the portion of the entry includes a second field of the entry indicating the first physical address, a first field of the entry indicating a first logical address corresponding to the first physical address, and the third field of the entry.

Figure 8:
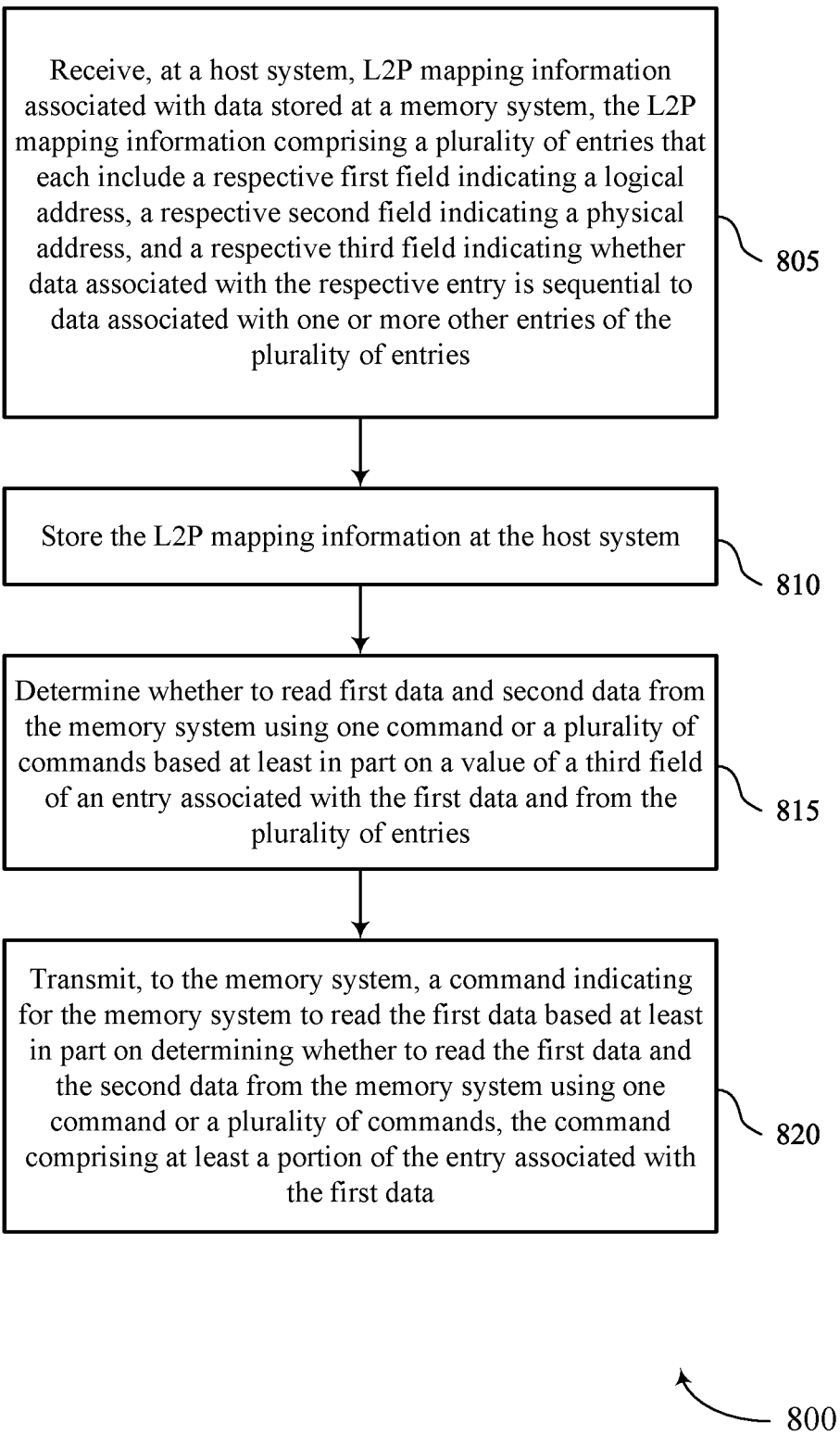

FIG. 8 shows a flowchart illustrating a method 800 that supports reading sequential data using mapping information stored at a host device in accordance with examples as disclosed herein. The operations of method 800 may be implemented by a host device or its components as described herein. For example, the operations of method 800 may be performed by a host device as described with reference to FIGS. 1 through 4 and 6. In some examples, a host device may execute a set of instructions to control the functional elements of the device to perform the described functions. Additionally or alternatively, the host device may perform aspects of the described functions using special-purpose hardware.

At 805, the method may include receiving, at a host system, logical to physical mapping information associated with data stored at a memory system, the logical to physical mapping information including a plurality of entries that each include a respective first field indicating a logical address, a respective second field indicating a physical address, and a respective third field indicating whether data associated with the respective entry is sequential to data associated with one or more other entries of the plurality of entries. The operations of 805 may be performed in accordance with examples as disclosed herein. In some examples, aspects of the operations of 805 may be performed by a L2P reception component 625 as described with reference to FIG. 6.

At 810, the method may include storing the logical to physical mapping information at the host system. The operations of 810 may be performed in accordance with examples as disclosed herein. In some examples, aspects of the operations of 810 may be performed by a L2P storage component 630 as described with reference to FIG. 6.

At 815, the method may include determining whether to read first data and second data from the memory system using one command or a plurality of commands based at least in part on a value of a third field of an entry associated with the first data and from the plurality of entries. The operations of 815 may be performed in accordance with examples as disclosed herein. In some examples, aspects of the operations of 815 may be performed by a read command determination component 635 as described with reference to FIG. 6.

At 820, the method may include transmitting, to the memory system, a command indicating for the memory system to read the first data based at least in part on determining whether to read the first data and the second data from the memory system using one command or a plurality of commands, the command including at least a portion of the entry associated with the first data. The operations of 820 may be performed in accordance with examples as disclosed herein. In some examples, aspects of the operations of 820 may be performed by a read command transmission component 640 as described with reference to FIG. 6.

In some examples, an apparatus as described herein may perform a method or methods, such as the method 800. The apparatus may include, features, circuitry, logic, means, or instructions (e.g., a non-transitory computer-readable medium storing instructions executable by a processor), or any combination thereof for performing the following aspects of the present disclosure:

Aspect 13: The apparatus, including features, circuitry, logic, means, or instructions, or any combination thereof for receiving, at a host system, logical to physical mapping information associated with data stored at a memory system, the logical to physical mapping information including a plurality of entries that each include a respective first field indicating a logical address, a respective second field indicating a physical address, and a respective third field indicating whether data associated with the respective entry is sequential to data associated with one or more other entries of the plurality of entries; storing the logical to physical mapping information at the host system; determining whether to read first data and second data from the memory system using one command or a plurality of commands based at least in part on a value of a third field of an entry associated with the first data and from the plurality of entries; and transmitting, to the memory system, a command indicating for the memory system to read the first data based at least in part on determining whether to read the first data and the second data from the memory system using one command or a plurality of commands, the command including at least a portion of the entry associated with the first data.

Aspect 14: The apparatus of aspect 13 where determining whether to read the first data and the second data from the memory system using one command or a plurality of commands, further includes operations, features, circuitry, logic, means, or instructions, or any combination thereof for determining to read the first data and the second data using a first plurality of commands based at least in part on the value of the third field of the entry indicating that the first data and the second data are non-sequential, where the first plurality of commands includes the command.

Aspect 15: The apparatus of aspect 13 where determining whether to read the first data and the second data from the memory system using one command or a plurality of commands, further includes operations, features, circuitry, logic, means, or instructions, or any combination thereof for determining to read the first data and the second data using one command based at least in part on the value of the third field of the entry indicating that the first data and the second data are sequential.

Aspect 16: The apparatus of aspect 15, further including operations, features, circuitry, logic, means, or instructions, or any combination thereof for receiving, from the memory system, the first data and the second data in response to transmitting the command and based at least in part on determining to read the first data and the second data using one command.

Aspect 17: The apparatus of any of aspects 15 through 16, further including operations, features, circuitry, logic, means, or instructions, or any combination thereof for identifying a plurality of physical addresses that each include sequential data beginning at the first data based at least in part on the value of the third field of the entry, where the sequential data includes the second data, and where determining to read the first data and the second data using one command is based at least in part on identifying the plurality of physical addresses.

Aspect 18: The apparatus of aspect 17, further including operations, features, circuitry, logic, means, or instructions, or any combination thereof for receiving, from the memory system, the first data and the sequential data in response to transmitting the command and based at least in part on identifying the plurality of physical addresses.

Aspect 19: The apparatus of any of aspects 13 through 14, further including operations, features, circuitry, logic, means, or instructions, or any combination thereof for including, in the command, an indication of a quantity of data to read from the memory system to the host system and receiving, from the memory system, the first data based at least in part on the indication of the quantity of data, where the quantity of data is equal to a quantity of the first data.

Aspect 20: The apparatus of any of aspects 15 through 18, further including operations, features, circuitry, logic, means, or instructions, or any combination thereof for including, in the command, an indication of a quantity of data to read from the memory system to the host system, where the quantity of data is determined based at least in part on a quantity of a stream of sequential data including the first data and the second data, the quantity of data less than or equal to the quantity of the stream of sequential data and receiving, from the memory system, the stream of sequential data in response to transmitting the command including the indication of the quantity of data, where the stream of sequential data includes the second data.

Aspect 21: The apparatus of any of aspects 15 through 18 and 20, further including operations, features, circuitry, logic, means, or instructions, or any combination thereof for the value of the third field of the entry indicates a quantity of a plurality of physical addresses that each include sequential data beginning at the first data.

Aspect 22: The apparatus of any of aspects 15 through 18, 20, and 21, further including operations, features, circuitry, logic, means, or instructions, or any combination thereof for the value of the third field of the entry indicates an order of the first data in a sequential stream of data.

Aspect 23: The apparatus of any of aspects 13 through 22, further including operations, features, circuitry, logic, means, or instructions, or any combination thereof for the at least the portion of the entry includes a second field of the entry indicating a first physical address associated with the first data.

Aspect 24: The apparatus of any of aspects 13 through 23, further including operations, features, circuitry, logic, means, or instructions, or any combination thereof for the at least the portion of the entry includes a second field of the entry indicating a first physical address associated with the first data, a first field of the entry indicating a first logical address corresponding to the first physical address, and the third field of the entry.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

As used herein, the term "substantially" means that the modified characteristic (e.g., a verb or adjective modified by the term substantially) need not be absolute but is close enough to achieve the advantages of the characteristic.

As used herein, the term "electrode" may refer to an electrical conductor, and in some examples, may be employed as an electrical contact to a memory cell or other component of a memory array. An electrode may include a trace, wire, conductive line, conductive layer, or the like that provides a conductive path between elements or components of a memory array.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   a memory system; and
   a controller coupled with the memory system and configured to cause the apparatus to:
   transmit, to a host system, logical to physical mapping information associated with data stored at the memory system, the logical to physical mapping information comprising a plurality of entries that each include a respective first field indicating a logical address, a respective second field indicating a physical address, and a respective third field comprising a respective value that indicates a respective quantity of data that is sequential to data associated with a respective entry;

receive, at the memory system, a command indicating for the memory system to read first data stored at the memory system after transmitting to the host system the logical to physical mapping information, the command comprising at least a value of a third field of an entry associated with the first data from the plurality of entries of the logical to physical mapping information; and determine whether to read, in addition to the first data and in response to the command, second data from a second physical address that is sequential to a first physical address of the first data based at least in part on a quantity of data that the value of the third field of the entry indicates is sequential to the first data.

2. The apparatus of claim 1, wherein the controller is further configured to determine whether to read the second data by causing the apparatus to:
determine to refrain from reading the second data based at least in part on the value of the third field of the entry indicating that the first data and the second data are non-sequential.

3. The apparatus of claim 1, wherein the controller is further configured to determine whether to read the second data by causing the apparatus to:
determine to read the second data based at least in part on the value of the third field of the entry indicating that the first data and the second data are sequential.

4. The apparatus of claim 3, wherein the controller is further configured to cause the apparatus to:
read the first data from the first physical address in response to receiving the command;
read the second data from the second physical address in response to receiving the command and based at least in part on determining to read the second data; and
transmit the first data and the second data to the host system based at least in part on reading the first data and reading the second data.

5. The apparatus of claim 3, wherein the controller is further configured to cause the apparatus to:
identify a plurality of physical addresses that each comprise sequential data beginning at the first data based at least in part on the value of the third field of the entry, wherein the plurality of physical addresses comprises the second physical address and the sequential data comprises the second data.

6. The apparatus of claim 5, wherein the controller is further configured to cause the apparatus to:
read the first data from the first physical address and the sequential data from the plurality of physical addresses in response to receiving the command and based at least in part on identifying the plurality of physical addresses; and
transmit the first data and the sequential data to the host system based at least in part on reading the first data and reading the sequential data.

7. The apparatus of claim 1, wherein the controller is further configured to cause the apparatus to:
identify, in the command, an indication of a second quantity of data to read from the memory system to the host system;
read the first data from the first physical address based at least in part on the indication of the second quantity of data, wherein the second quantity of data is equal to a quantity of the first data; and
transmit the first data to the host system based at least in part on reading the first data.

8. The apparatus of claim 1, wherein the controller is further configured to cause the apparatus to:
identify, in the command, an indication of a second quantity of data to read from the memory system to the host system;
read the first data from the first physical address and a stream of sequential data following the first data from a plurality of physical addresses based at least in part on the indication of the second quantity of data, wherein the stream of sequential data comprises the second data and the plurality of physical addresses comprises the second physical address, and wherein the second quantity of data is greater than a quantity of the first data; and
transmit the first data and the stream of sequential data to the host system based at least in part on reading the first data and reading the stream of sequential data.

9. The apparatus of claim 1, wherein the value of the third field of the entry indicates a quantity of a plurality of physical addresses that each comprise sequential data beginning at the first data.

10. The apparatus of claim 1, wherein the value of the third field of the entry indicates an order of the first data in a sequential stream of data.

11. The apparatus of claim 1, wherein the command further comprises a second field of the entry indicating the first physical address and a first field of the entry indicating a first logical address corresponding to the first physical address.

12. An apparatus, comprising:
a controller configured to couple with a memory system, wherein the controller is configured to cause the apparatus to:
receive, at a host system, logical to physical mapping information associated with data stored at a memory system, the logical to physical mapping information comprising a plurality of entries that each include a respective first field indicating a logical address, a respective second field indicating a physical address, and a respective third field comprising a respective value that indicates a respective quantity of data that is sequential to data associated with a respective entry;
store the logical to physical mapping information at the host system;
determine, after storing the logical to physical mapping information at the host system, whether to read first data and second data from the memory system using one command or a plurality of commands based at least in part on a quantity of data that a value of a third field of an entry indicates is sequential to the first data and from the plurality of entries; and
transmit, to the memory system, a command indicating for the memory system to read the first data based at least in part on determining whether to read the first data and the second data from the memory system using one command or a plurality of commands, the command comprising at least the value of the third field of the entry.

13. The apparatus of claim 12, wherein the controller is further configured to determine whether to read the first data and the second data from the memory system using one command or a plurality of commands by causing the apparatus to:

determine to read the first data and the second data using a first plurality of commands based at least in part on the value of the third field of the entry indicating that the first data and the second data are non-sequential, wherein the first plurality of commands comprises the command.

14. The apparatus of claim 12, wherein the controller is further configured to determine whether to read the first data and the second data from the memory system using one command or a plurality of commands by causing the apparatus to:

determine to read the first data and the second data using one command based at least in part on the value of the third field of the entry indicating that the first data and the second data are sequential.

15. The apparatus of claim 14, wherein the controller is further configured to cause the apparatus to:

receive, from the memory system, the first data and the second data in response to transmitting the command and based at least in part on determining to read the first data and the second data using one command.

16. The apparatus of claim 14, wherein the controller is further configured to cause the apparatus to:

identify a plurality of physical addresses that each comprise sequential data beginning at the first data based at least in part on the value of the third field of the entry, wherein the sequential data comprises the second data, and wherein determining to read the first data and the second data using one command is based at least in part on identifying the plurality of physical addresses.

17. The apparatus of claim 16, wherein the controller is further configured to cause the apparatus to:

receive, from the memory system, the first data and the sequential data in response to transmitting the command and based at least in part on identifying the plurality of physical addresses.

18. The apparatus of claim 12, wherein the controller is further configured to cause the apparatus to:

include, in the command, an indication of a second quantity of data to read from the memory system to the host system; and receive, from the memory system, the first data based at least in part on the indication of the second quantity of data, wherein the second quantity of data is equal to a quantity of the first data.

19. The apparatus of claim 12, wherein the controller is further configured to cause the apparatus to:

include, in the command, an indication of a second quantity of data to read from the memory system to the host system, wherein the second quantity of data is determined based at least in part on a quantity of a stream of sequential data comprising the first data and the second data, the second quantity of data less than or equal to the quantity of the stream of sequential data; and receive, from the memory system, the stream of sequential data in response to transmitting the command comprising the indication of the second quantity of data, wherein the stream of sequential data comprises the second data.

20. A non-transitory computer-readable medium storing code comprising instructions which, when executed by a processor of an electronic device, cause the electronic device to:

transmit, to a host system, logical to physical mapping information associated with data stored at a memory system, the logical to physical mapping information comprising a plurality of entries that each include a respective first field indicating a logical address, a respective second field indicating a physical address, and a respective third field comprising a respective value that indicates a respective quantity of data that is sequential to data associated with a respective entry;

receive, at the memory system, a command indicating for the memory system to read first data stored at the memory system after transmitting to the host system the logical to physical mapping information, the command comprising at least a value of a third field of an entry associated with the first data from the plurality of entries of the logical to physical mapping information; and determine whether to read, in addition to the first data and in response to the command, second data from a second physical address that is sequential to a first physical address of the first data based at least in part on a quantity of data that the value of the third field of the entry indicates is sequential to the first data.

\* \* \* \* \*